(12) United States Patent
Chen

(10) Patent No.: US 9,052,531 B2
(45) Date of Patent: Jun. 9, 2015

(54) PAIR OF GLASSES WITH AN ADJUSTABLE NOSE PAD FOR FINE-TUNING ADJUSTMENT

(71) Applicant: INJEXTECH INC., Tainan (TW)

(72) Inventor: Yu-Sheng Chen, Tainan (TW)

(73) Assignee: INJEXTECH INC., Tainan (TW)

( * ) Notice: Subject to any disclaimer, the term of this patent is extended or adjusted under 35 U.S.C. 154(b) by 92 days.

(21) Appl. No.: 13/926,164

(22) Filed: Jun. 25, 2013

(65) Prior Publication Data

US 2014/0375948 A1    Dec. 25, 2014

(51) Int. Cl.
*G02C 5/12*    (2006.01)

(52) U.S. Cl.
CPC *G02C 5/124* (2013.01); *G02C 5/12* (2013.01); *G02C 5/122* (2013.01)

(58) Field of Classification Search
CPC .......... G02C 5/12; G02C 5/122; G02C 5/126
USPC ................... 351/137, 138, 111, 115, 128, 76
See application file for complete search history.

(56) References Cited

U.S. PATENT DOCUMENTS

| 4,878,749 | A  | * | 11/1989 | McGee | ........................... 351/52 |
| 8,408,696 | B2 | * | 4/2013  | Hsieh | ........................... 351/137 |
| 2009/0021691 | A1 | * | 1/2009 | Yang | ........................... 351/137 |

* cited by examiner

*Primary Examiner* — Ricky Mack
*Assistant Examiner* — Kristina Garcia
(74) *Attorney, Agent, or Firm* — Muncy, Geissler, Olds & Lowe, P.C.

(57) ABSTRACT

A pair of glasses has a glasses body and an adjusting structure. The glasses body has a lens frame and a nose pad. The nose pad is combined with the lens frame by two sliding slices and two tracks. The adjusting structure is mounted between the lens frame and the nose pad and has a first engaging block, a second engaging block, and a stopping block. The first engaging block and the second engaging block can be engaged with each other to keep the nose pad from separating from the lens frame. The stopping block is mounted to form a friction between the nose pad and the lens frame. The nose pad can be precisely adjusted and fine-tuned relative to the lens frame because of the sliding slices, the tracks, and the stopping block.

8 Claims, 5 Drawing Sheets

PAIR OF GLASSES WITH AN ADJUSTABLE NOSE PAD FOR FINE-TUNING ADJUSTMENT

BACKGROUND OF THE INVENTION

1. Field of the Invention

The present invention relatives to a pair of glasses, and more particularly to a pair of glasses with an adjustable nose pad for fine-tuning the fit with the nose.

2. Description of Related Art

Nearsightedness glasses, hyperopia glasses, or sunglasses are provided to meet daily demand of users. Regardless of types of the glasses, a nose pad is always mounted between the lens frames. In use, the nose pad abuts the bridge of the nose of the user to support the lens frames and to increase the wearing comfort for the user. However, the position of the conventional nose pad relative to the lens frames cannot be adjusted. The distance between the bridge of the nose and the eyes differs from user to user, such that the wearing comfort may be degraded when the said distance cannot match the distance between the nose pad and the lens frame.

With reference to FIG. 8, a conventional pair of glasses comprises a lens unit 30, a nose pad 40, and an adjusting structure 50. The lens unit 30 and the nose pad 40 are moveably combined with each other. The adjusting structure 50 is mounted between the lens unit 30 and the nose pad 40. The adjusting structure 50 comprises three engaging troughs 51 and an engaging block 52. The engaging troughs 51 are formed in the lens unit 30 and provide three adjusting levels. The engaging block 52 is engaged in one of the engaging troughs 51. The position of the nose pad 40 relative to the lens unit 30 can be adjusted by moving the nose pad 40 to make the engaging block 52 moved between the engaging troughs 51.

However, the lens unit 30 and the nose pad 40 can be separated from each other, such that the engaging block 52 has to be engaged in one of the engaging troughs 51 to combine the nose pad 40 with the lens unit 30. Therefore, the nose pad 40 may be detached from the lens unit 30 while the nose pad 40 is adjusted relative to the lens unit 30. When the nose pad 40 and the lens unit 30 are separated from each other, the user has to assemble them again. On the other hand, the engaging troughs 51 provide only three adjusting levels, so the engaging block 52 can only be moved between the three adjusting levels instead of being finely and precisely adjusted in the engaging troughs 51.

SUMMARY OF THE INVENTION

The main objective of the present invention is to provide a pair of glasses to solve the mentioned problems.

The pair of glasses comprises a glasses body and an adjusting structure. The glasses body comprises a lens frame and a nose pad. The lens frame comprises two lens portions and an assembly portion being flexible and connected between the lens portions. The nose pad is flexible, is combined with the lens frame and comprises a combining portion moveably combined with the assembly portion, wherein the combining portion and the assembly portion are combined with each other by at least one sliding slice and at least one track; the combining portion also comprises two pad bodies mounted and extending on the combining portion.

The adjusting structure is mounted between the assembly portion and the combining portion and comprises a first engaging block, a second engaging block mounted corresponding to the first engaging block to engage the nose pad and the lens frame, and a stopping block comprising a height and mounted between the assembly portion and the combining portion.

The first engaging block and the second engaging block can be engaged with each other to prevent the nose pad and the lens frame from separating from each other. The relative position between the nose pad and the lens frame can be adjusted by sliding the sliding slice in the track to meet the objective of fine-tuning adjustment.

DETAILED DESCRIPTION OF PREFERRED EMBODIMENT

Figure 1:
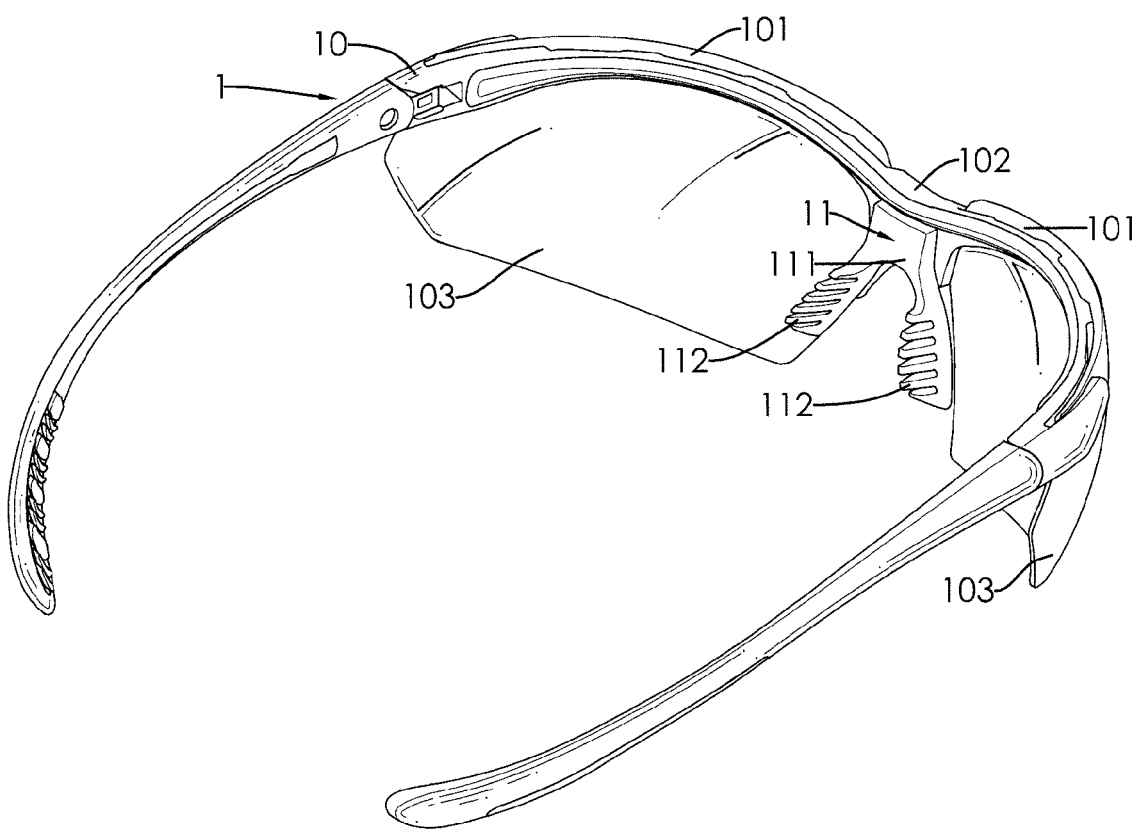
FIG. 1 is a perspective view of a preferred embodiment of a pair of glasses with an adjustable nose pad for fine-tuning adjustment in accordance with the present invention.
Figure 2:
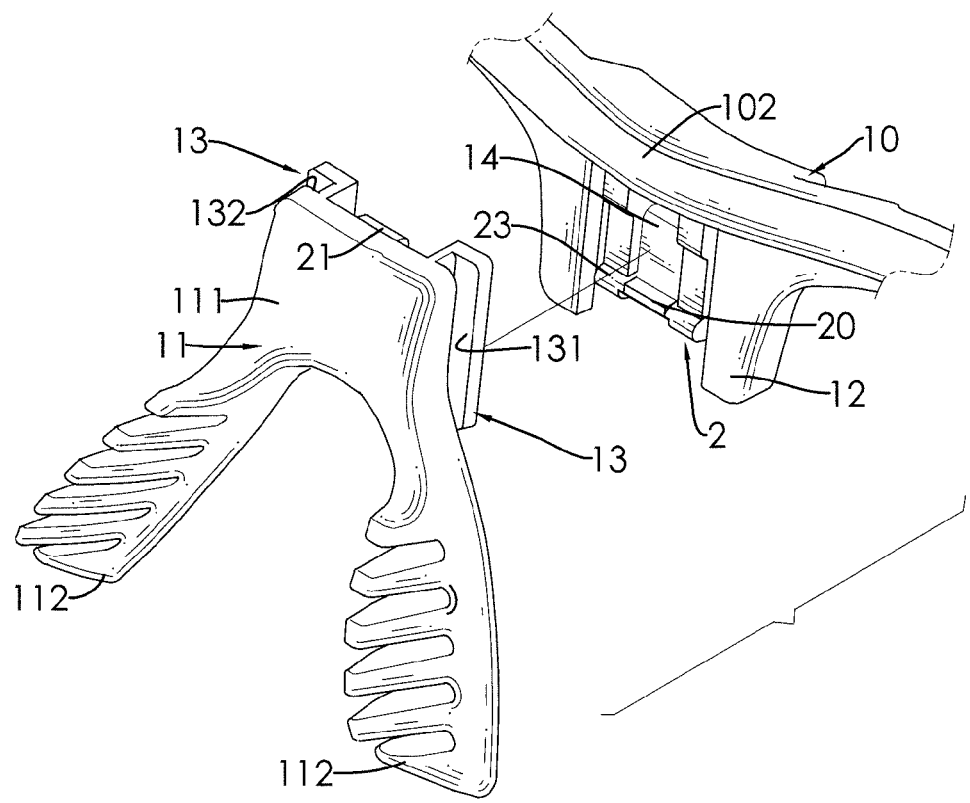
FIG. 2 is an enlarged partially exploded perspective view of the pair of glasses in FIG. 1.
Figure 3:
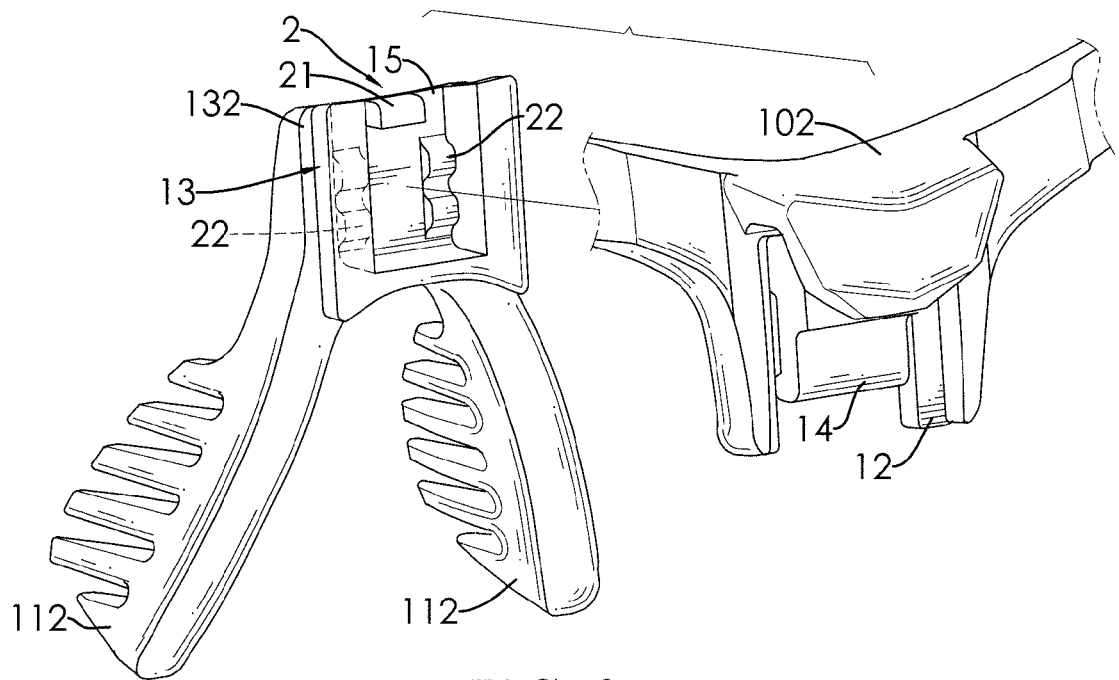
FIG. 3 is another enlarged partially exploded perspective view of the pair of glasses in FIG. 1.

With reference to FIGS. 1 to 3, a preferred embodiment of a pair of glasses with an adjustable nose pad for fine-tuning adjustment in accordance with the present invention comprises a glasses body 1 and an adjusting structure 2.

The glasses body 1 comprises a lens frame 10, a nose pad 11, two sliding slices 12, two tracks 13, an engaging slice 14, and a trough 15. The lens frame 10 is flexible and comprises two lens portions 101, an assembly portion 102 and two lenses 103. The assembly portion 102 is connected between the lens portions 101. The lenses 103 are connected with the lens portions 101 respectively. The nose pad 11 is also flexible and comprises a combining portion 111 and two pad bodies 112. The combining portion 111 is moveably combined with the assembly portion 102 of the lens frame 10. The pad bodies 112 are mounted on the combining portion 111 and extend toward a direction opposite to the lens 103.

Further, the combining portion 111 and the assembly portion 102 are combined with each other by the sliding slices 12 and the tracks 13 that match the sliding slices 12 respectively. Preferably, the sliding slices 12 are mounted on two sides of the assembly portion 102 of the lens frame 10, and the tracks 13 are mounted on two sides of the combining portion 111 of the nose pad 11. Each track 13 comprises a first wall 131 and a second wall 132, wherein the first wall 131 and the second wall 132 are parallel with each other. The first wall 131 and the second wall 132 moveably clamp the corresponding sliding slice 12 in position. When the first walls 131 and the second walls 132 of the tracks 13 move relative to the sliding slices 12, the nose pad 11 can move relative to the assembly portion 102.

Figure 4:
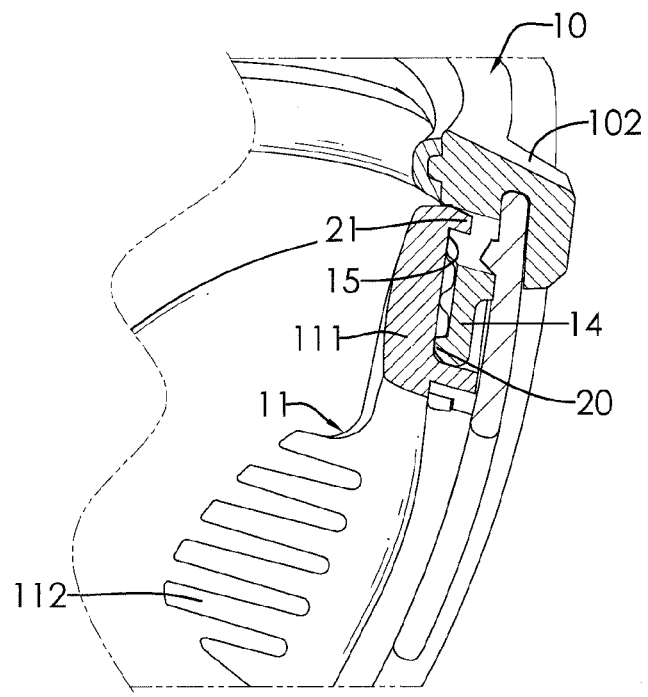
FIG. 4 is an enlarged perspective view in partial section of the pair of glasses in FIG. 1.

With reference to FIG. 2, FIG. 3 and FIG. 4, the engaging slice 14 protrudes from the assembly portion 102, and the trough 15 is concaved in the combining portion 111 and faces the engaging slice 14. The engaging slice 14 is moveably engaged in the trough 15. The engaging slice 14 may protrude from the combining portion 111 and the trough 15 may be concaved in the assembly portion 102.

With reference to FIGS. 2 to 5, the adjusting structure 2 is mounted on the assembly portion 102 and the combining portion 111 to adjustably combine the combining portion 111 with the assembly portion 102. The adjusting structure 2 comprises a first engaging block 20, a second engaging block 21, two stopping blocks 22 and a positioning rib 23. The first engaging block 20 protrudes from the bottom side of the engaging slice 14 and toward the combining portion 111. The second engaging block 21 protrudes from the top side of the trough 15 and toward the assembly portion 102.

The stopping blocks 22 protrude from a right side and a left side of the trough 15 respectively and toward the assembly portion 102. Each stopping block 22 comprises a height from a top side to a bottom side of the stopping block 22, wherein the heights of the stopping blocks 22 may be different or same with each other. Preferably, each stopping block 22 has a concaved positioning trough and two bumps, wherein the positioning trough is located between the bumps. The height of the bump is higher than that of the positioning trough. Each stopping block 22 selectively abuts the engaging slice 14 to form a friction between the assembly portion 102 and the combining portion 111. Alternatively, the adjusting structure 2 may only have a stopping block 22. The positioning ribs 23 are mounted on the bottom side of the engaging slice 14, are located at a right side and a left side of the first engaging block 20 respectively and protrude toward the combining portion 111. The positioning ribs 23 abut the stopping blocks 22 selectively and respectively. Alternatively, the positions of the stopping blocks 22 and the positioning ribs 23 may be exchanged. That is, the stopping blocks 22 may be mounted on the engaging slice 14 and the positioning ribs 23 may be mounted in the trough 15. Alternatively, the adjusting structure 2 may only have a positioning rib 23.

In use, each sliding slice 12 can be inserted between the first wall 131 and the second wall 132 of each corresponding track 13 respectively and move from the top side to the bottom side of the combining portion 111. The nose pad 11 cannot be easily separated from the lens frame 10 since the first engaging block 20 and the second engaging block 21 are engaged with each other.

Figure 5:
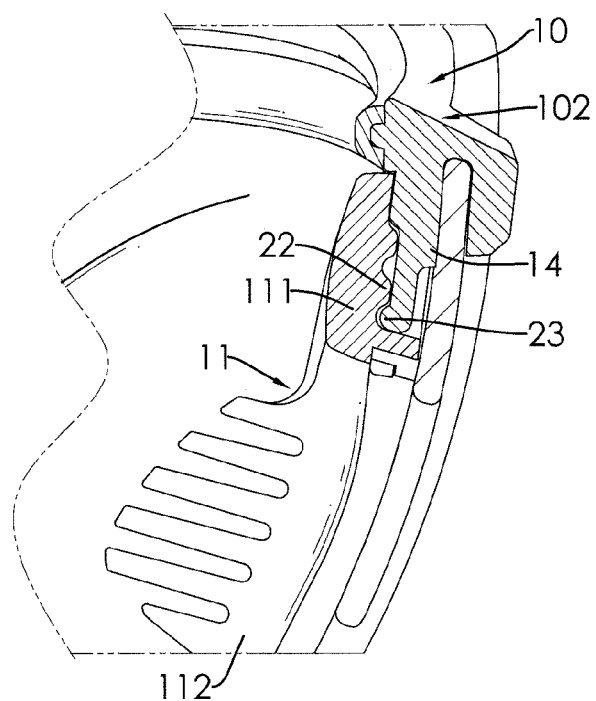
FIG. 5 is another enlarged perspective view in partial section of the pair of glasses in FIG. 1.
Figure 6:
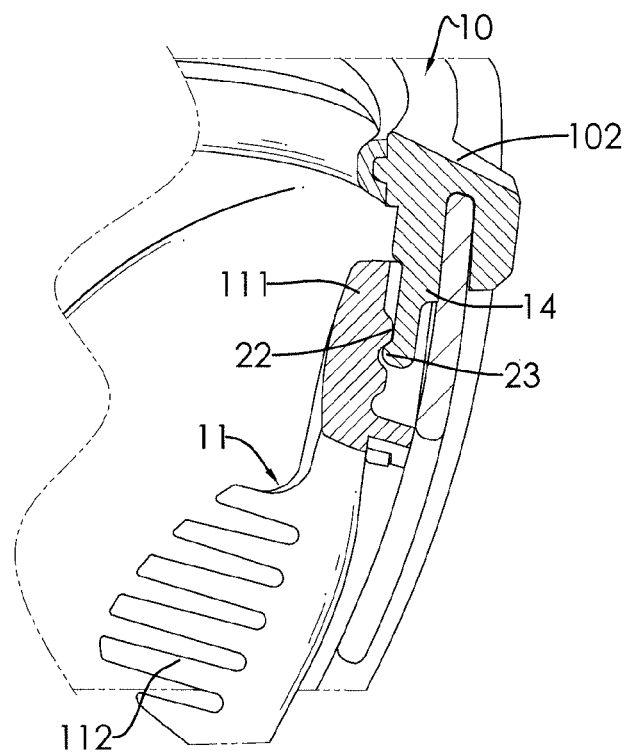
FIG. 6 is an enlarged operational perspective view in partial section of the pair of glasses in FIG. 1.

With reference to FIGS. 4 to 6, the sliding slice 14 abuts the stopping blocks 22, such that the friction between the assembly portion 102 and the combining portion 111 can maintain the relative position of them. To pull the nose pad 11 to move relative to the lens frame 10, the user has to overcome the friction between the assembly portion 102 and the combining portion 111. The nose pad 11 moves toward the bottom side of the sliding slice 14 to make the positioning ribs 23 engaged between bumps of the stopping blocks 22. When the positioning ribs 23 are engaged between the bumps of the stopping blocks 22, the user has to pull the nose pad 11 more strongly relative to the lens frame 10 since the friction at the bumps of the stopping blocks 22 is larger than the friction at the concaved positioning troughs of the stopping blocks 22. Therefore, the nose pad 11 can be positioned relative to the lens frame 10

Figure 7:
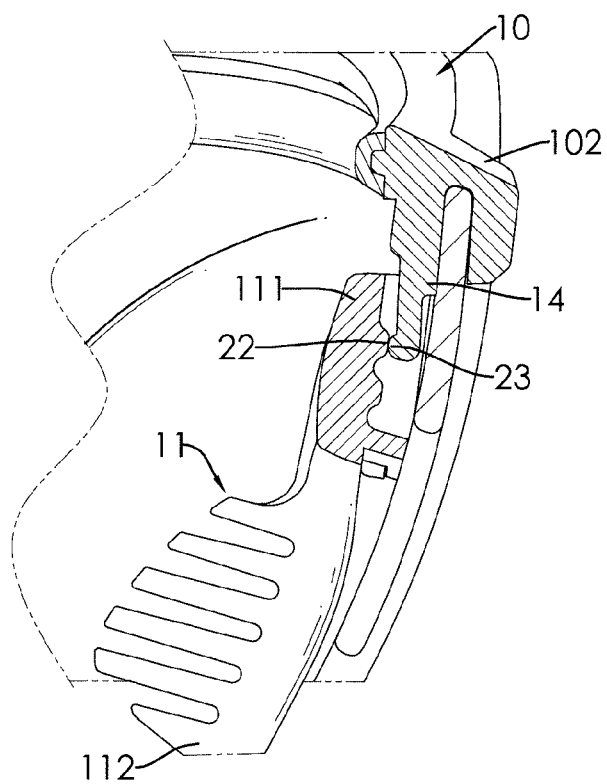
FIG. 7 is an enlarged operational perspective view in partial section of the pair of glasses in FIG. 1.
Figure 8:
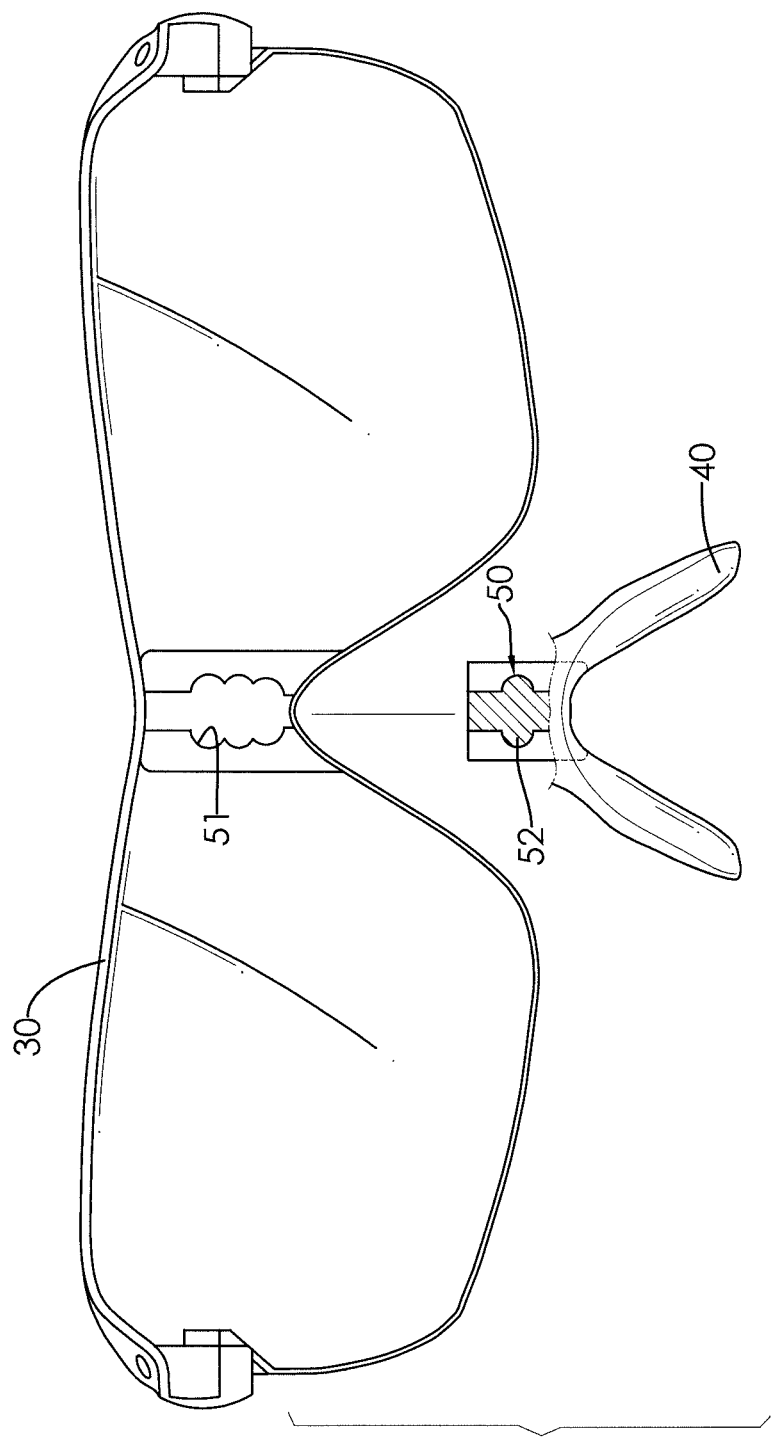
FIG. 8 is an exploded front view in partial section of a conventional pair of glasses.

With reference to FIG. 7, after the nose pad 11 is further pulled to move relative to the lens frame 10, the positioning ribs 23 escape from the concaved positioning troughs of the stopping blocks 22 respectively. Therefore, the nose pad 11 can be moved relative to the lens frame 10 via the sliding slices 12 and the tracks 13. The position of the nose pad 11 relative to the lens frame 10 can be finely and precisely adjusted to maintain the wear comfort for user by overcoming different degrees of friction between the assembly portion 102 and the combining portion 111. The first engaging block 20 and the second engaging block 21 can keep the nose pad 11 from separating from the lens frame 10. The stopping blocks 22 and the positioning ribs 23 can further provide a positioning effect.

What is claimed is:

1. A pair of glasses comprising:
    a glasses body comprising:
        a lens frame comprising:
            two lens portions; and
            an assembly portion being flexible and connected between the lens portions;
        a nose pad being flexible, combined with the lens frame and comprising:
            a combining portion moveably combined with the assembly portion, wherein the combining portion and the assembly portion are combined with each other by at least one sliding slice and at least one track; and
            two pad bodies mounted and extending on the combining portion;
        a trough; and
        an engaging slice moveably engaging in the trough; and
    an adjusting structure mounted between the assembly portion and the combining portion and comprising:
        a first engaging block;
        a second engaging block corresponding to the first engaging block to engage the nose pad and the lens frame;
        a stopping block comprising a height and mounted between the assembly portion and the combining portion; and
        a positioning rib abutting the stopping block,
    wherein the trough and the engaging slice are disposed between the assembly portion and the combining portion, and the adjusting structure is mounted between the trough and the engaging slice.

2. The pair of glasses as claimed in claim 1, wherein the positioning rib and the first engaging block protrude from a bottom side of the engaging slice and face the trough;
    the second engaging block protrudes from a top side of the trough; and
    the stopping block protrudes on the trough and abuts the positioning rib and the engaging slice.

3. The pair of glasses as claimed in claim 2, wherein two sliding slices are implemented and two tracks are implemented;
    the sliding slices are mounted on two sides of the engaging slice respectively; and
    the tracks are mounted on two sides of the trough and clamp the sliding slices respectively.

4. The pair of glasses as claimed in claim 1, wherein two sliding slices are implemented and two tracks are implemented;
    the sliding slices are mounted on two sides of the engaging slice respectively; and
    the tracks are mounted on two sides of the trough and clamp the sliding slices respectively.

5. The pair of glasses as claimed in claim 1, wherein the engaging slice is mounted on the assembly portion, and the trough is concaved in the combining portion.

6. The pair of glasses as claimed in claim 5, wherein two sliding slices are implemented and two tracks are implemented;

the sliding slices are mounted on two sides of the engaging slice respectively; and the tracks are mounted on two sides of the trough and clamp the sliding slices respectively.

7. The pair of glasses as claimed in claim 5, wherein the first engaging block protrudes from a bottom side of the engaging slice and faces the trough;

the second engaging block protrudes from a top side of the trough; and the stopping block protrudes from the trough and abuts the engaging slice.

8. The pair of glasses as claimed in claim 7, wherein two sliding slices are implemented and two tracks are implemented;

the sliding slices are mounted on two sides of the engaging slice respectively; and the tracks are mounted on two sides of the trough and clamp the sliding slices respectively.

\* \* \* \* \*